Oct. 2, 1951   P. B. CRAIGHEAD ET AL   2,569,628
DEMOUNTABLE CRANE
Filed March 10, 1945   5 Sheets-Sheet 1
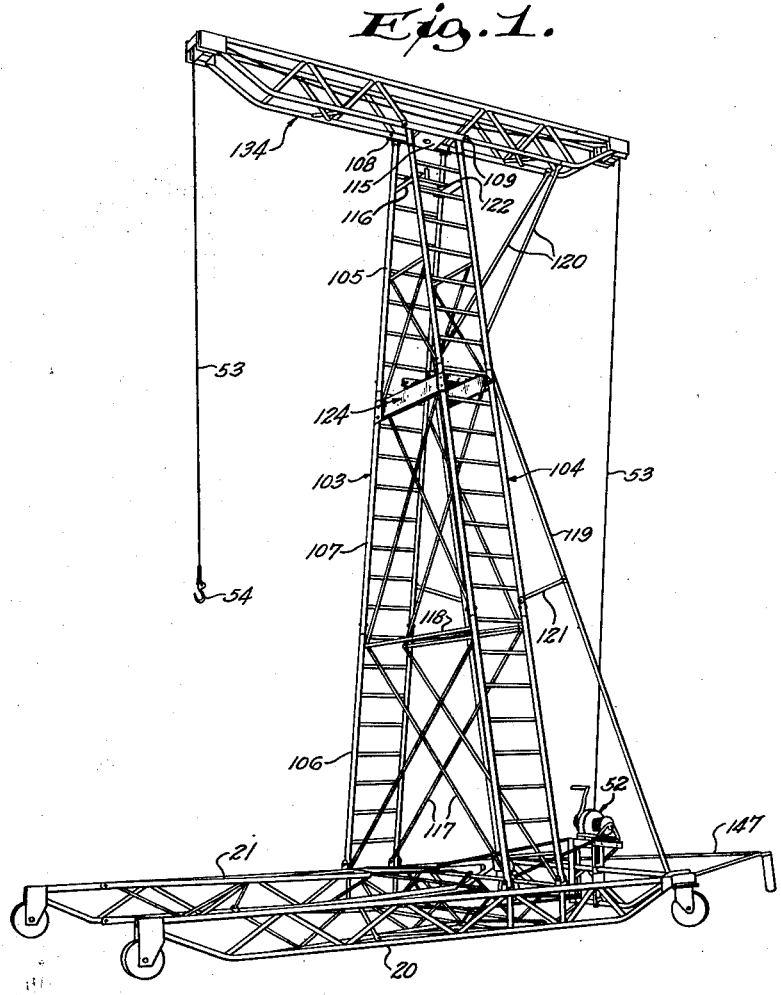
Fig. 1.
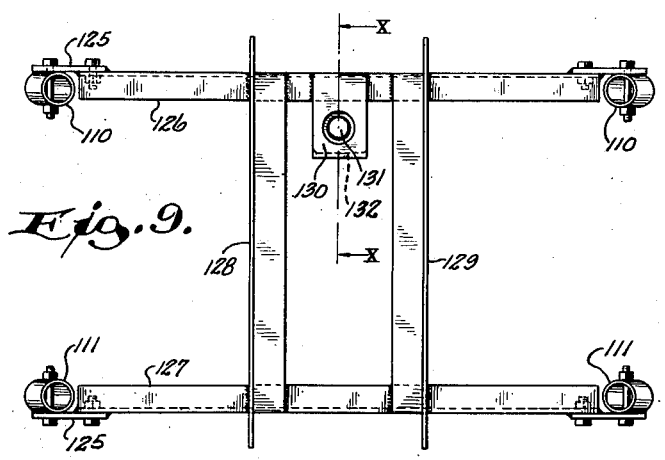
Fig. 9.
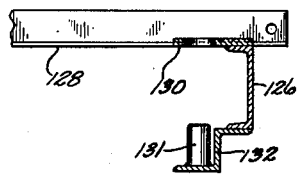
Fig. 10.
INVENTORS
PHILIP B. CRAIGHEAD
GEORGE H. NELSON
BY
ATTORNEY.

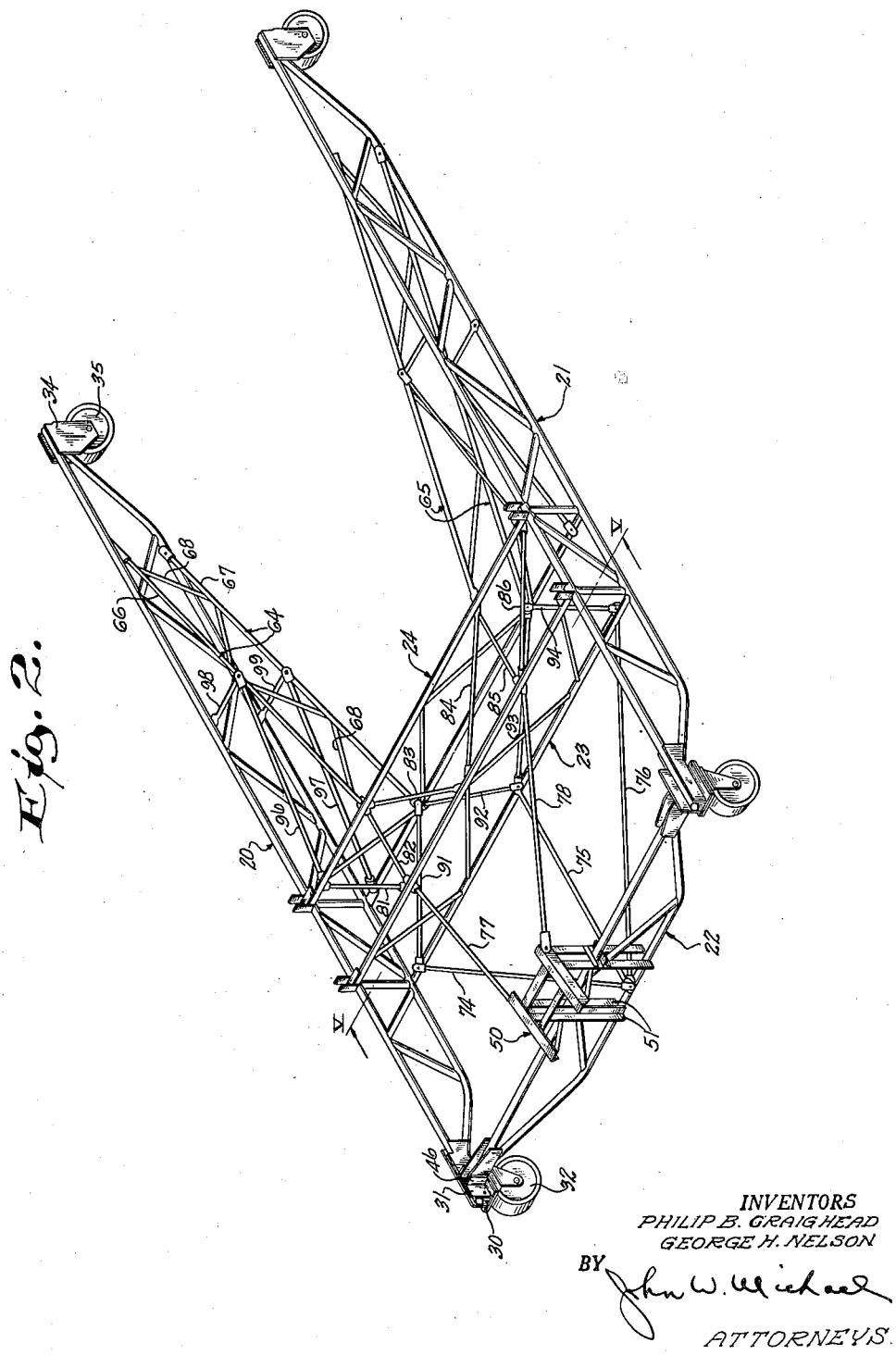

Oct. 2, 1951 P. B. CRAIGHEAD ET AL 2,569,628
DEMOUNTABLE CRANE
Filed March 10, 1945 5 Sheets-Sheet 3
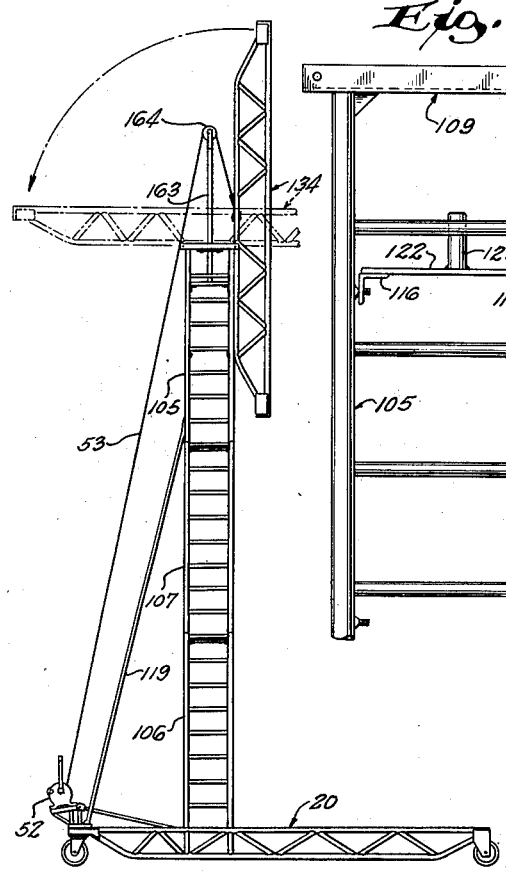
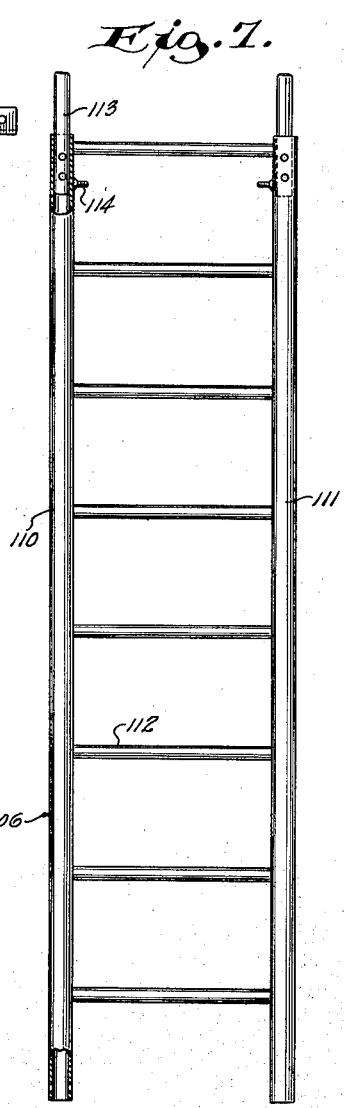
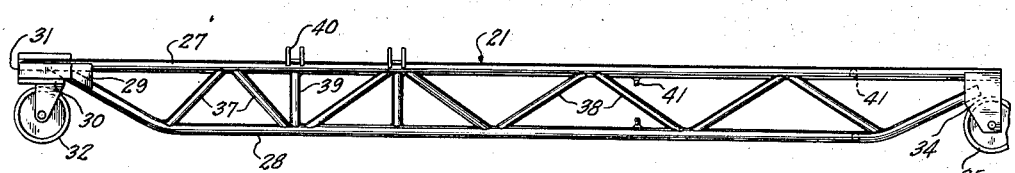
INVENTORS
PHILIP B. CRAIGHEAD
GEORGE H. NELSON
BY John W. Michael
ATTORNEY.

INVENTORS
PHILIP B. CRAIGHEAD
GEORGE H. NELSON
BY John W. Michael
ATTORNEY.

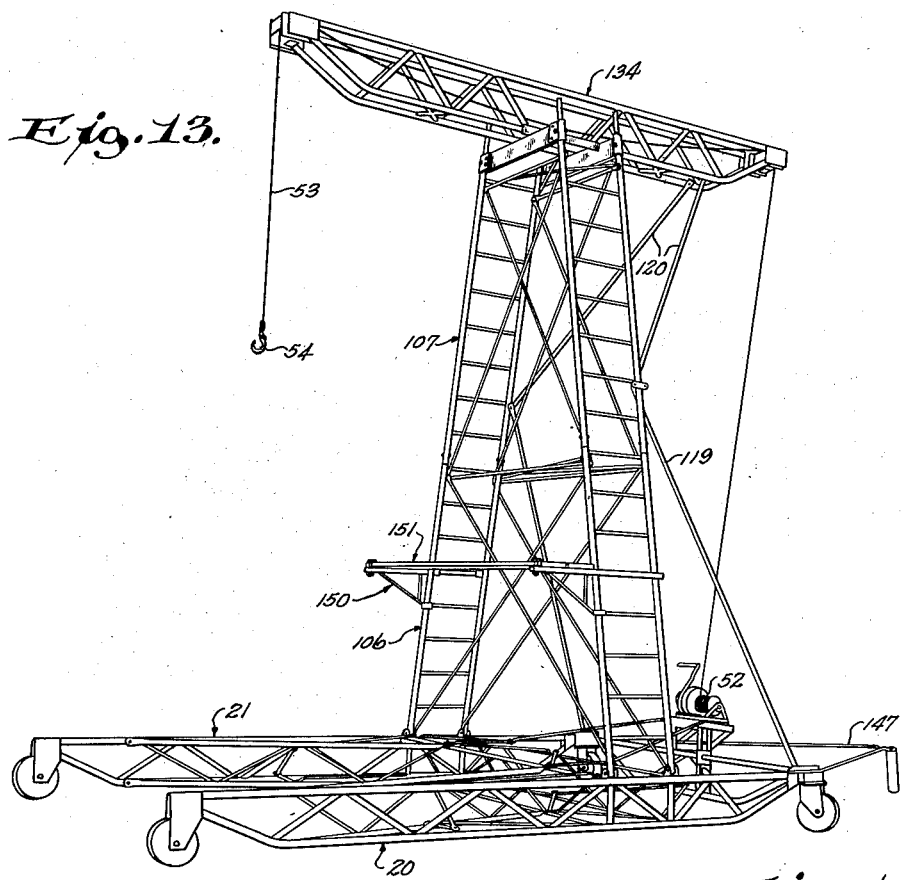
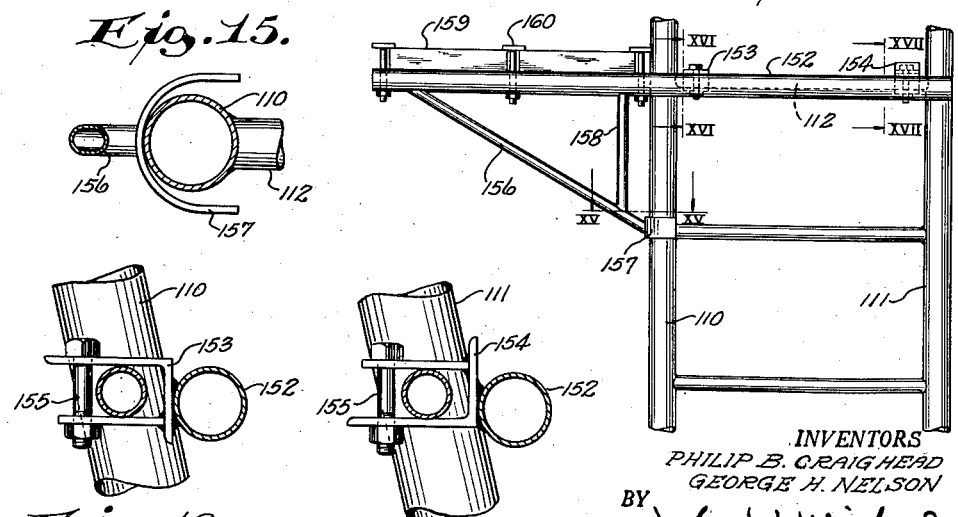

Patented Oct. 2, 1951

2,569,628

UNITED STATES PATENT OFFICE 2,569,628

DEMOUNTABLE CRANE

Philip B. Craighead, Milwaukee, and George H. Nelson, Wauwatosa, Wis., assignors to Safway Steel Products, Inc., Milwaukee, Wis., a corporation of Wisconsin Application March 10, 1945, Serial No. 582,062

2 Claims. (Cl. 189—16)

This invention relates to improvements in cranes which may be either portable or stationary, and particularly to cranes of the character which, together with a load, are readily portable by man-power and are readily assembled and disassembled into a plurality of sub-assemblies or units.

It is one object of the invention to provide a crane so constructed as to be usable manually and readily portable, together with its load, by man-power and without the need for mechanical power.

Another object of the invention is to provide a crane, composed of a number of unit sub-assemblies, which may be readily handled by a minimum number of men and which are individually simple and are easily combined and in which the sub-assemblies are readily shipped and stored.

Another object of the invention is to provide a crane construction in which the partially assembled structure is used to erect other portions of the crane without the use of scaffolding or similar erection accessories.

Another object of the invention is to provide a crane in which the portions of the crane structure itself act as the scaffolding in erection of other crane portions and a support upon which other crane portions are hoisted into place.

Another object of the invention is to provide a crane in which the boom is emplaced on the mast by the use of the previously assembled portions of the crane structure and a single temporary mast extension.

Another object of the invention is to provide a crane in which the boom may be mounted at any one of a number of desired locations above the base of the crane.

Another object of the invention is to provide a crane having its full clearance for lifting the load for the entire space between the crane base and the boom.

Another object of the invention is to provide a crane which is simple as a whole, readily assembled and disassembled by unskilled labor so that at least partial disassembly between usages is practical, and in which the major portions or sections of the crane are divided into permanent sub-assemblies or units.

Objects and advantages other than those above set forth will be apparent from the following description when read in connection with the accompanying drawings, in which:

Fig. 1 is a perspective view of a completed crane structure;

Fig. 2 is a perspective view of the base portion of the crane;

Fig. 3 is an elevation of one of two side trusses forming part of the crane base;

Fig. 7 is an elevation of one of the crane mast sub-assembly units for mounting on the crane base;

Fig. 8 is an elevation of a fragment of an upper crane mast unit or ladder with one of the boom seats in place thereon;

Fig. 9 is a top plan view of another of the boom seats on the mast;

Fig. 10 is a section taken on the plane of the line X—X of Fig. 9;

Fig. 13 is a perspective view of the crane with the boom mounted on the lower level boom seat and shows a working platform extending from the crane mast;

Fig. 14 is an end elevation of one of the working platform brackets and the platform shown mounted on a fragment of the mast;

Fig. 15 is a cross section taken on the plane of the line XV—XV of Fig. 14;

Fig. 16 is a cross section taken on the plane of the line XVI—XVI of Fig. 14;

Fig. 17 is a cross section taken on the line XVII—XVII of Fig. 14; and

Fig. 18 is a diagram of the crane in side elevation showing some of the steps in the erection thereof.

Figure 4:
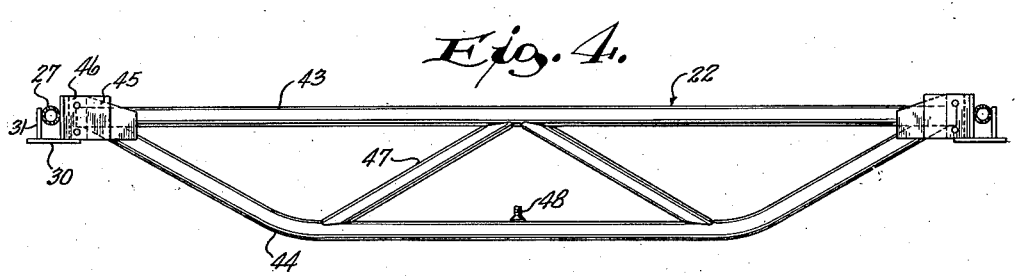
Fig. 4 is an elevation of an end truss of the crane brace.

The structure herein disclosed is made up generally of tubing, plates, and structural shapes so combined into a plurality of unit sub-combinations as to provide adequate strength for given loads with only so much weight as to be readily assembled and transported by man-power only. The crane includes the three major portions or sections of a base, a mast, and a boom, and each of such sections is divided into a plurality of sub-assemblies or sub-combination units which are readily handled, stored, and shipped as units, and are readily assembled and disassembled.

Referring to the drawings, and particularly to

Fig. 2, the base portion of the crane comprises generally a pair of side trusses 20, 21 connected at one end by an end truss 22 and connected intermediate their ends by a pair of cross trusses 23, 24, the several trusses being interconnected by a plurality of separate brace trusses and individual braces to be identified. Referring now to Fig. 3, it will be seen that the base side trusses 20 and 21 each include an upper and substantially straight chord 27 and a bottom or lower chord 28 extending in spaced and substantially parallel relation with the upper chord for a major portion of its length but bent at the ends toward the upper chord and severally joined at one of such ends with the upper chord by plates 29, which, together with a base plate 30 and side plates 31, form several mountings for a swiveling caster or wheel 32 which is well known and not further described. The other ends of the chords 27, 28 are joined by plates 34 extending downwardly from the lower chord to severally furnish bearings for the axle of non-swivelling casters or wheels 35. The two chords of each truss are braced in spaced relation by diagonal members 37 and 38 extending between the chords at various angles calculated to provide the best support for the loads to be imposed on the truss and are also provided with a pair of substantially vertical braces 39 so placed as to transmit the mast weight and the load on the mast to the several truss chords. Pairs of spaced lugs 40 are fixed on and extend upwardly from the upper chords 27 of the side base trusses to provide seats for one of the chords of the cross trusses 23 and 24 and extend at an angle to the vertical to provide points for attachment or anchoring points for the mast. The base side trusses are provided with suitable studs, indicated at 41, so placed as to provide points of attachment for brace trusses and braces, as shown in Fig. 2.

The crane base end or front truss 22 (see Fig. 4) is formed with top and bottom chords 43, 44, respectively, the top chord 43 being substantially straight and the bottom chord 44 being bent at the ends and joined to the top chord. The ends of the several chords are also joined by plates 45 which extend into seats formed therefor by the side truss base plates 30 and plates 46 extending from the side plates 31 on the base side trusses. The chords 43, 44 are braced by diagonal members 47 and the several chords have studs, as indicated at 48, mounted thereon for the attachment thereto of separate bracing members. The end or front truss 22 extends between the side trusses 20 and 21, as shown in Fig. 2, and at the ends thereof on which the swivel casters are mounted, and furnishes the support for a bracket, generally designated 50, on which a winch is to be mounted. The legs of the bracket are bifurcated, as indicated at 51, to slip over and rest on the end truss 22 to which they are secured in a suitable manner. The winch, which is generally designated at 52, and is of well-known construction and is not further described, is shown as manually operated for winding up or releasing a cable 53 with a load hook 54 on the free end thereof.

Figure 5:
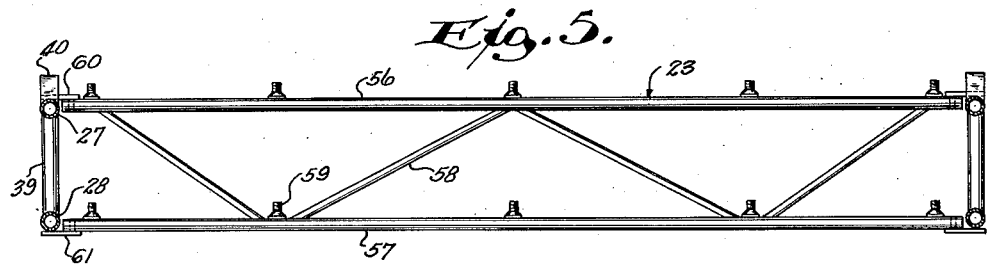
Fig. 5 is a section taken on the plane of the line V—V of Fig. 2 to show the base section cross or intermediate trusses and the manner of their attachment to the side trusses of the crane base.

The cross or intermediate trusses 23, 24 are particularly shown in Fig. 5 and severally comprise a top chord 56 and a bottom chord 57 which extend substantially in parallel relation and are spaced at the same distance as the parallel portions of the base side trusses 20, 21. The chords 56 and 57 are braced and spaced by diagonal members 58 and have fixed thereon a plurality of studs 59 to receive the ends of other braces to be identified. The ends of the truss chords 56 and 57 are removably attached to plates 60 and 61 extending laterally from the base side trusses 20 and 21 and preferably from between the pairs of spaced lugs 40. The cross trusses 23, 24 are accordingly so mounted that they extend beneath the mast from the legs thereof and coact in distributing and transmitting the loads therefrom between the base side trusses.

Figure 6:
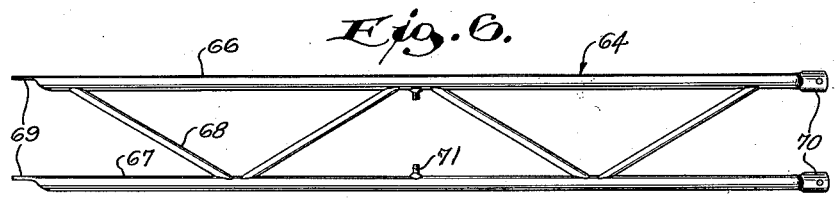
Fig. 6 is an elevation of one of the base trusses of the crane base.

The cross truss 24 is braced from points between its ends, and the ends of the several side trusses 20, 21, by trusses generally designated 64 and 65 in Fig. 2 and shown in detail in Fig. 6. Each of the brace trusses is formed by a top chord 66 and a bottom chord 67 joined by diagonal braces 68 in parallel relation and at substantially the spacing between the base side trusses 20, 21. It will be seen that the chord ends 69 are flattened and offset to rest on the cross truss chords, and that the chord ends 70 are flattened and turned at right angles to the ends 69 and are suitably curved to seat on the sides of the side truss chords. Studs 71 are fixed on the brace truss chords to receive other brace members to be identified.

Separate brace members extend between the bottom chord 44 of the end truss 22 and the bottom chord 57 of the first cross truss 23 and are designated at 74, 75, and 76, and braces 77 and 78 extend between the winch bracket 50 and the top chord 56 of the cross truss 23. Brace members 81 to 86, inclusive, extend between the top chords of the cross braces 23 and 24, and similar brace members 91 to 94, inclusive, extend between the bottom chords of such cross trusses. The braces 81 to 86, inclusive, include both diagonal members and members set at right angles to the truss chords, while the braces 91 to 94, inclusive, include only diagonal members. Brace members 96, 97 extend from the top and bottom chords of the cross truss 24 to severally connect with the studs 71 of the brace trusses 64 and 65, and braces 98, 99 extend from the same studs to the upper and lower chords, respectively, of the side trusses 20 and 21.

A mast is mounted on the base above described and is formed of two legs, generally designated 103 and 104 in Fig. 1, and which legs are identical in structure. Each of the legs are formed from three ladder units, designated 106, 107, and 108, which are themselves substantially identical, the ladder section 106 being shown in detail in Fig. 7. Such ladder section is formed from side or lateral pieces 110 and 111 connected by cross pieces or rungs 112 so spaced as to be readily climbable by the average person. The ladder side pieces 110, 111 are tubular and internally of such size as to fit between the lugs 40 at one end and are pivotally connected thereto by bolts extending through the side members and the lugs. The other ends of the ladder side pieces have coupling pins 113 secured therein and extending therefrom and have studs 114 fixed on and extending toward each other from facing portions of the side member surfaces. The coupling pins 113 of the ladder unit 106 receive the lower ends of the intermediate ladder unit 107 which also has coupling pins at the upper end thereof, and such pins in turn engage with the lower ends of the upper ladder unit 108. The ladder units are braced by diagonal members 117 and cross members 118, and the ladder is braced to the base portion of the crane on the winch side of the mast by the braces 119. Braces 120 also extend from the upper region of the mast to the end of the boom extending over the winch. It will be seen that the ladder units are trusses in effect and that such trusses are so interconnected by individual braces as to make the mast an operative whole. The braces 119 are divided into two parts joined by coupling pins, the brace joints being stiffened by braces 121 extending from the braces 119 adjacent the joint to the side rails of the adjacent mast legs. Hence one of the portions of braces 119 only may be used in the structure shown in Fig. 13.

The ladder units 107 have mounted thereon a boom seat, generally designated 124 in Fig. 1, and shown in detail in Figs. 9 and 10 as comprising plates 125 removably fastened to each of the ladder side pieces 110 and 111 of each of the mast legs 103 and 104. The plates on the several side members of each leg are fastened to lateral members 126 and 127 shown as being channel-shaped in cross-section, and such channel members are interconnected by cross pieces 128 and 129 shown as being angle-shaped and as being fixed transversely on the channel members in the position shown in Fig. 9 to form the actual seat for the boom. A plate 130 is fixed on the lateral boom seat channel 126 and extends toward the other boom seat channel 127 to bring an opening through the plate over a pin 131 mounted on a Z bar 132 attached to the channel member 126.

Another boom seat is formed on the upper ends of the ladder units 105 and generally comprises angles 108 and 109 joining the ends of each of the ladder units and detachably interconnected with a plate 115 with a hole substantially central therethrough. Angles 116 are detachably mounted to connect the side pieces of the ladder units of the opposing mast legs 103 and 104 a relatively small distance below the tops of the ladder units 105. The angles 116 are interconnected by a plate 122 (see Fig. 8) having a pin 123 extending therefrom. The function of the pin 123, in connection with the upper boom seat, and of the pin 131, in connection with the lower boom seat, will be apparent from the following description of the erection or mounting of the boom on the mast.

Figure 11:
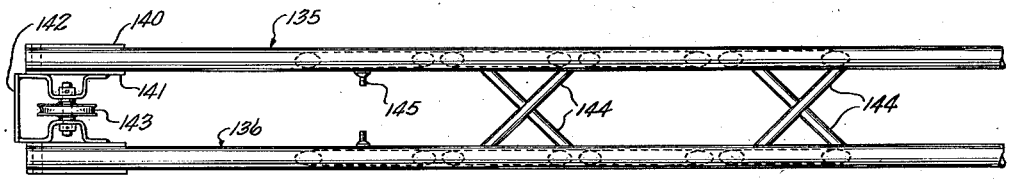
Fig. 11 is a top plan view of a fragment of the boom section of the crane.
Figure 12:
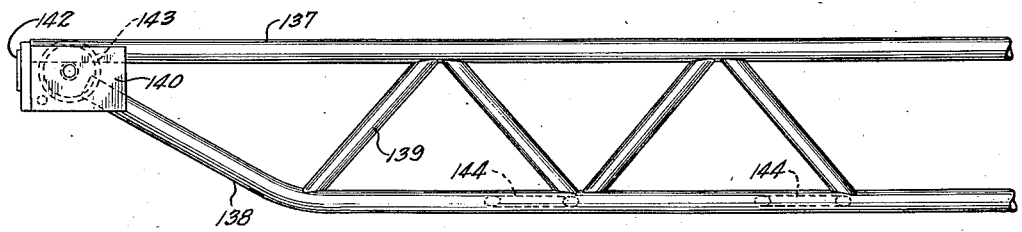
Fig. 12 is a side elevation of the boom fragment shown in Fig. 11.

A boom, generally designated 134 in Fig. 1, is shown in detail in Figs. 11 and 12. The boom is made as a double truss with the truss portions 135 and 136 each comprising a substantially straight top chord 137 and a bottom chord 138 having its ends bent for connection with the top chord, the two chords being interconnected by diagonal bracing 139. The top and bottom chords of the several trusses are joined by plates 140 and 141 and the two trusses have mounted between the joined ends thereof spacer and supporting means 142 for the several pulleys 143 over which the cable 53 is reeved. The two trusses are also spaced and braced by a plurality of members 144 extending between the top chords and the bottom chords of the several trusses. The boom trusses are provided with studs 145 by which they are secured on the seat with the studs engaging the seat angles, and for other purposes.

The entire crane structure may be drawn from place to place by means of a handle or tow bar 147, it being understood that the casters may be replaced by other supports, such as the well-known jacks shown, for example, in Patent 2,203,114, issued to Uecker, Rambo, and Beatty, on June 6, 1940, when portability of the crane is not required, at which time the handle 147 is also omitted.

The structure shown in Fig. 13 is similar to that above described excepting that only two ladder sections 106 and 107 are used. Fig. 13 also shows brackets, generally indicated at 150, for supporting a working platform 151 on the mast at any desired height from the base. The brackets comprise main members 152 to which are fixed U-shaped clips 153, 154 so placed as to extend about and be engageable with any rung 112 of any ladder unit. When the ladder units are so engaged, the main bracket member 152 rests against the ladder side pieces and is held in a given position by suitable fastening means, such as bolts 155 passing through the ends of the clips 153 and 154. Diagonal braces 156 extend from the outer ends of the bracket members 152 and end in semi-circular strap-like feet 157 engageable with the ladder side pieces, and other braces 158 extend substantially in a vertical direction between the several bracket members 152 and 156. Suitable planks 159 are mounted on the brackets preferably by clamping on the several bracket members 152 by bolts 160 extending through the bracket main members.

The manner in which the base section of the crane and the mast section of the crane are respectively assembled will be readily apparent to one skilled in the art. However, particularly convenient means are provided for raising the boom to any one of the seats on the mast and for securing the boom therein. Such means are shown in Fig. 18 as including a tubular temporary mast extension 163 adapted to extend through the hole in the plate 115 or 130 and to seat on the pin 123 or 131. The mast extension 163 has a pulley 164 mounted on its upper end so that the cable 53 may be run over the pulley and the hook 54 may be attached to the center of the assembled boom 134. The boom is then raised by winding the cable on the winch to raise the boom to the position shown in Fig. 18 relative to either the lower or upper seat. (It will be understood that the boom is guided by a line while being raised.) Holes in the boom then center on holes in the mast seat angles 108, 109 or 128, 129, and are loosely connected by bolts to hold the boom in its raised position. The cable is then disconnected from the boom, and the temporary mast extension 163 is removed from the mast, whereupon the boom may be pivoted (as indicated in dotted lines) about its loose connections with the seat and may be brought into its finally seated position where the boom is then fastened to prevent movement in or from the seat.

It will, of course, be understood that the chords of the various trusses, the braces of the several trusses, and the individual braces between the trusses are made of tubing and that the ends of the separate braces are flattened and provided with holes to receive the studs mounted at the various locations shown on the several trusses. The ladder units of the mast are also made of tubing, the side pieces of the ladder units having the same internal diameter. The lower ladder unit side pieces fit between the lugs provided therefor on the side trusses of the base, and the other ladder units fit over the coupling pins of adjacent units. The end truss serves both to stiffen the base and to support the winch in the most advantageous position under the overhanging end of the boom and is braced to the cross trusses at only the points required to best transmit forces between the trusses. The mast is so positioned on the base portion of the crane that the load hook 54 may be brought into the proper position for fastening to a load, such, for example, as the engine of an airplane, while the base straddles a part of the airplane under-carriage. The cross braces, with the separate bracings therebetween, are located directly under the mast to exert the maximum bracing effect with the minimum of material in each of the trusses and braces. The brace trusses are so located on and braced from the cross trusses and the side trusses that the greater length of the base extends beneath the load hook which is substantially centered on such length of the base.

Although but one embodiment of the present invention has been illustrated and described, it will be apparent to those skilled in the art that various changes and modifications may be made therein without departing from the spirit of the invention or from the scope of the appended claims.

We claim:

1. In a demountable crane, a base, a pair of interconnected converging mast legs mounted on said base, each of said legs including a plurality of coupled truss members each having parallel longitudinally extending sides and transversely extending connecting members, a pair of spaced generally parallel angle members connecting said mast legs at the upper ends of said legs, said angle members including vertical and horizontal flanges defining a generally U-shaped boom seat having its longitudinal axis generally parallel to said flanges, at least one end of the vertical flange of each of said angle members being extended beyond corresponding longitudinal side members of said truss members, said extended angle flanges being adjacent, and a boom pivotally connected to said extended flanges, said boom being adapted for pivotal movement from a substantially vertical position into said seat, and releasable means securing said boom in said seat to prevent pivotal movement of the boom.

2. In a demountable crane, a base, a pair of interconnected converging mast legs mounted on said base, each of said legs including a plurality of truss members coupled in end to end relation, said truss members each having parallel longitudinal sides and transversely extending connecting members, a pair of spaced generally parallel angle members at the upper ends of said legs, said angle members including vertical and horizontal flanges defining a generally U-shaped boom seat having its longitudinal axis generally parallel to said flanges, the vertical flange of each of said angle members being longer than the horizontal flanges thereof and extending beyond the horizontal flanges at each end thereof, a boom fitting between the vertical flanges of the angle members and seating in said seat, and releasable horizontal pivotal connections between said boom and adjacent ends of said vertical flanges at opposite ends of the seat to normally retain the boom rigid with respect to said converging mast legs while permitting the boom to be pivoted about one of said pivotal connections when desired.

PHILIP B. CRAIGHEAD.
GEORGE H. NELSON.

REFERENCES CITED

The following references are of record in the file of this patent:

UNITED STATES PATENTS

| Number | Name | Date |
|---|---|---|
| D. 138,893 | Hercik | Sept. 26, 1944 |
| 882,161 | Olive | Mar. 17, 1908 |
| 933,493 | Scholes | Sept. 7, 1909 |
| 1,128,261 | Swenson | Feb. 9, 1915 |
| 1,143,019 | Auchu | June 15, 1915 |
| 1,380,779 | Craig | June 7, 1921 |
| 1,428,887 | Hescock | Sept. 12, 1922 |
| 1,539,109 | Brandt | May 26, 1925 |
| 1,607,510 | Bowers | Nov. 16, 1926 |
| 1,719,528 | Beckley et al. | July 2, 1929 |
| 1,720,322 | Ferraioli | July 9, 1929 |
| 2,201,608 | Causey | May 21, 1940 |
| 2,210,026 | Connors, Jr. | Aug. 6, 1940 |
| 2,229,653 | Hohl | Jan. 28, 1941 |
| 2,294,993 | Lavin | Sept. 8, 1942 |
| 2,316,952 | Halferty | Apr. 20, 1943 |
| 2,320,620 | LeTourneau | June 1, 1943 |
| 2,342,139 | Gleason | Feb. 22, 1944 |
| 2,377,758 | Cohen | June 5, 1945 |
| 2,378,605 | Watson | July 19, 1945 |
| 2,437,647 | McLean | Mar. 9, 1948 |

FOREIGN PATENTS

| Number | Country | Date |
|---|---|---|
| 94,001 | Germany | Sept. 4, 1897 |